(12) United States Patent
Pang et al.

(10) Patent No.: US 11,217,236 B2
(45) Date of Patent: Jan. 4, 2022

(54) METHOD AND APPARATUS FOR EXTRACTING INFORMATION

(71) Applicant: Baidu Online Network Technology (Beijing) Co., Ltd., Beijing (CN)

(72) Inventors: Xiangyu Pang, Beijing (CN); Guangyao Tang, Beijing (CN)

(73) Assignees: Baidu Online Network Technology (Beijing) Co., Ltd., Beijing (CN); Shanghai Xiadu Technology Co., Ltd., Shanghai (CN)

( * ) Notice: Subject to any disclaimer, the term of this patent is extended or adjusted under 35 U.S.C. 154(b) by 128 days.

(21) Appl. No.: 16/105,560

(22) Filed: Aug. 20, 2018

(65) Prior Publication Data

US 2019/0096402 A1  Mar. 28, 2019

(30) Foreign Application Priority Data

Sep. 25, 2017  (CN) .......................... 201710875327.7

(51) Int. Cl.
*G10L 15/22* (2006.01)
*G10L 15/18* (2013.01)
(Continued)

(52) U.S. Cl.
CPC ............ *G10L 15/22* (2013.01); *G06F 40/284* (2020.01); *G06F 40/53* (2020.01);
(Continued)

(58) Field of Classification Search
CPC ......... G06F 17/30864; G06F 17/30669; G06F 17/30707; G06F 3/011
See application file for complete search history.

(56) References Cited

U.S. PATENT DOCUMENTS 6,311,152 B1 * 10/2001 Bai ....................... G06F 40/289
704/9
9,529,898 B2 * 12/2016 Epstein ................. G06F 40/289
(Continued)

FOREIGN PATENT DOCUMENTS

CN           105187656     *  9/2015
CN           105187656 A    12/2015
(Continued)

*Primary Examiner* — Anne L Thomas-Homescu
(74) *Attorney, Agent, or Firm* — Knobbe, Martens, Olson & Bear, LLP (57) ABSTRACT

A method and an apparatus for extracting information are provided. The method according to an embodiment includes: receiving and parsing voice information of a user to generate text information corresponding to the voice information; extracting to-be-recognized contact information from the text information; acquiring an address book of the user, the address book including at least two pieces of contact information; generating at least two types of matching information based on the to-be-recognized contact information; determining, for each of the at least two types of matching information, a matching degree between the to-be-recognized contact information and each of at least two pieces of contact information based on the type of matching information; and extracting contact information matching the to-be-recognized contact information from the address book based on the determined matching degree.

17 Claims, 5 Drawing Sheets

(51) Int. Cl.
*G10L 25/51* (2013.01)
*G06F 40/53* (2020.01)
*G06F 40/284* (2020.01)
*G10L 15/08* (2006.01)
*G10L 15/193* (2013.01)
*G06F 40/194* (2020.01)

(52) U.S. Cl.
CPC .......... *G10L 15/1822* (2013.01); *G10L 25/51* (2013.01); *G06F 40/194* (2020.01); *G10L 15/193* (2013.01); *G10L 2015/088* (2013.01); *G10L 2015/226* (2013.01)

(56) References Cited

U.S. PATENT DOCUMENTS

| | | | |
|---|---|---|---|
| 10,614,483 B1* | 4/2020 | Zhao | G06F 16/24578 |
| 2008/0312928 A1* | 12/2008 | Goebel | G10L 15/26 |
| | | | 704/255 |
| 2010/0010993 A1* | 1/2010 | Hussey, Jr. | G06F 16/9535 |
| | | | 707/E17.005 |
| 2012/0158751 A1* | 6/2012 | Tseng | G06F 16/9535 |
| | | | 707/751 |
| 2013/0332164 A1* | 12/2013 | Nalk | G10L 15/187 |
| | | | 704/243 |
| 2014/0188835 A1* | 7/2014 | Zhang | G06F 40/211 |
| | | | 707/706 |
| 2016/0147853 A1* | 5/2016 | Golobrodsky | G06F 16/36 |
| | | | 707/756 |
| 2017/0147698 A1* | 5/2017 | Chen | G06F 16/9535 |
| 2017/0255653 A1* | 9/2017 | Zhu | G06F 16/51 |
| 2017/0255692 A1* | 9/2017 | Lei | G06F 40/53 |
| 2017/0324858 A1* | 11/2017 | Gao | G06Q 10/10 |
| 2018/0151199 A1* | 5/2018 | Chen | G06F 16/735 |
| 2018/0254036 A1* | 9/2018 | Li | G10L 15/063 |
| 2018/0336241 A1* | 11/2018 | Noh | G06N 20/00 |
| 2019/0065612 A1* | 2/2019 | Kenthapadi | G06Q 10/10 |
| 2019/0155884 A1* | 5/2019 | Liu | G06F 40/169 |
| 2019/0163786 A1* | 5/2019 | Bansal | G06F 16/24578 |
| 2019/0180753 A1* | 6/2019 | Raja | G10L 25/18 |
| 2019/0204907 A1* | 7/2019 | Xie | G06F 3/048 |

FOREIGN PATENT DOCUMENTS

| | | | |
|---|---|---|---|
| CN | 107016994 | * | 1/2016 |
| CN | 106603792 | * | 1/2017 |
| CN | 106603792 A | | 4/2017 |
| CN | 107016994 A | | 8/2017 |
| JP | 02014137636 A | * | 1/2013 |
| JP | 2014137636 A | | 7/2014 |

* cited by examiner

METHOD AND APPARATUS FOR EXTRACTING INFORMATION

CROSS-REFERENCE TO RELATED APPLICATIONS

This application claims the priority of Chinese Application No. 201710875327.7, filed on Sep. 25, 2017, titled "Method and Apparatus for Extracting Information," the entire disclosure of which is incorporated herein by reference.

TECHNICAL FIELD

The present disclosure relates to the field of computer technology, specifically relates to the field of speech recognition technology, and more specifically relates to a method and apparatus for extracting information.

BACKGROUND

Automatic speech recognition (ASR) aims to convert vocabulary content in human speech into computer-readable input, such as keys, binary codes, or sequences of characters. Speech recognition technology has been widely used, such as in speech dialing, speech navigation, indoor device control, and speech document retrieval. In some scenarios, it is necessary to extract the contact information desired by a user from an address book by recognizing the speech of the user.

However, the existing method for extracting contact information desired by a user from an address book has a problem of low accuracy.

SUMMARY

The objective of embodiments of the present disclosure includes proposing an improved method and apparatus for extracting information, to solve the technical problem mentioned in the foregoing Background section.

In a first aspect, a method for extracting information is provided according to the embodiments of the present disclosure. The method includes: receiving and parsing voice information of a user to generate text information corresponding to the voice information; extracting to-be-recognized contact information from the text information; acquiring an address book of the user, the address book including at least two pieces of contact information; generating at least two types of matching information based on the to-be-recognized contact information; determining, for each of the at least two types of matching information, a matching degree between the to-be-recognized contact information and each of the at least two pieces of contact information based on the type of matching information; and extracting contact information matching the to-be-recognized contact information from the address book based on the determined matching degree.

In a second aspect, an apparatus for extracting information is provided according to the embodiments of the present disclosure. The apparatus includes: a parsing unit, configured to receive and parse voice information of a user to generate text information corresponding to the voice information; a first extraction unit, configured to extract to-be-recognized contact information from the text information; an acquisition unit, configured to acquire an address book of the user, the address book including at least two pieces of contact information; a generation unit, configured to generate at least two types of matching information based on the to-be-recognized contact information; a determination unit, configured to determine, for each of the at least two types of matching information, a matching degree between the to-be-recognized contact information and each of at least two pieces of contact information based on the type of matching information; and a second extraction unit, configured to extract contact information matching the to-be-recognized contact information from the address book based on the determined matching degree.

In a third aspect, a device is provided according to the embodiments of the present disclosure, including: one or more processors; and a memory, for storing one or more programs, the one or more programs, when executed by the one or more processors, cause the one or more processors to implement the method according to the first aspect.

In a fourth aspect, a computer readable storage medium is provided according to the embodiments of the present disclosure, storing a computer program thereon, the program, when executed by a processor, implements the method according to the first aspect.

The method and apparatus for extracting information provided by the embodiments of the present disclosure first extracts to-be-recognized contact information from voice of the user by using speech recognition, then generates at least two types of matching information based on the to-be-recognized contact information, and then determines the matching degree between the to-be-recognized contact information and each piece of contact information in the address book of the user based on each type of the matching information, and finally extracts the contact information using the matching degrees. In this process, the multiple types of matching information may be used for matching, so that the contact information matching the true meaning of the user may be better recognized, thereby improving the accuracy of the extracted contact information.

DETAILED DESCRIPTION OF DRAWINGS

After reading detailed descriptions of non-limiting embodiments given with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
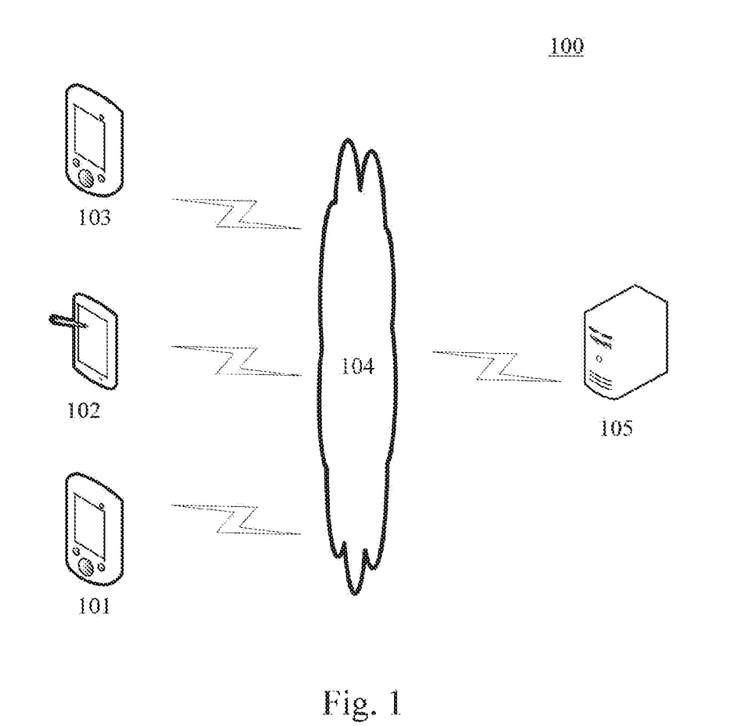
FIG. 1 is an exemplary architecture of a system to which the present disclosure may be applied.

FIG. 1 shows an exemplary architecture of a system 100 in which a method for extracting information or an apparatus for extracting information according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as voice assistant applications, shopping applications, search applications, instant messaging tools, mailbox clients, and social platform software may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend server providing a support to the voice assistance applications of the terminal devices 101, 102 or 103. The backend server may analyze the data such as the received voice information, and return a processing result (for example, information extracted from the voice information) to the terminal devices.

It should be noted that the method for extracting information according to the embodiments of the present disclosure is generally executed by the server 105. Accordingly, the apparatus for extracting information is generally installed on the server 105. It should be noted that the method for extracting information according to the embodiments of the present disclosure may alternatively be executed by the terminals 101, 102 and 103.

It should be appreciated that the numbers of the terminal devices, the networks and the servers in FIG. 1 are merely illustrative. Any number of terminal devices, networks and servers may be provided based on the actual requirements.

Figure 2:
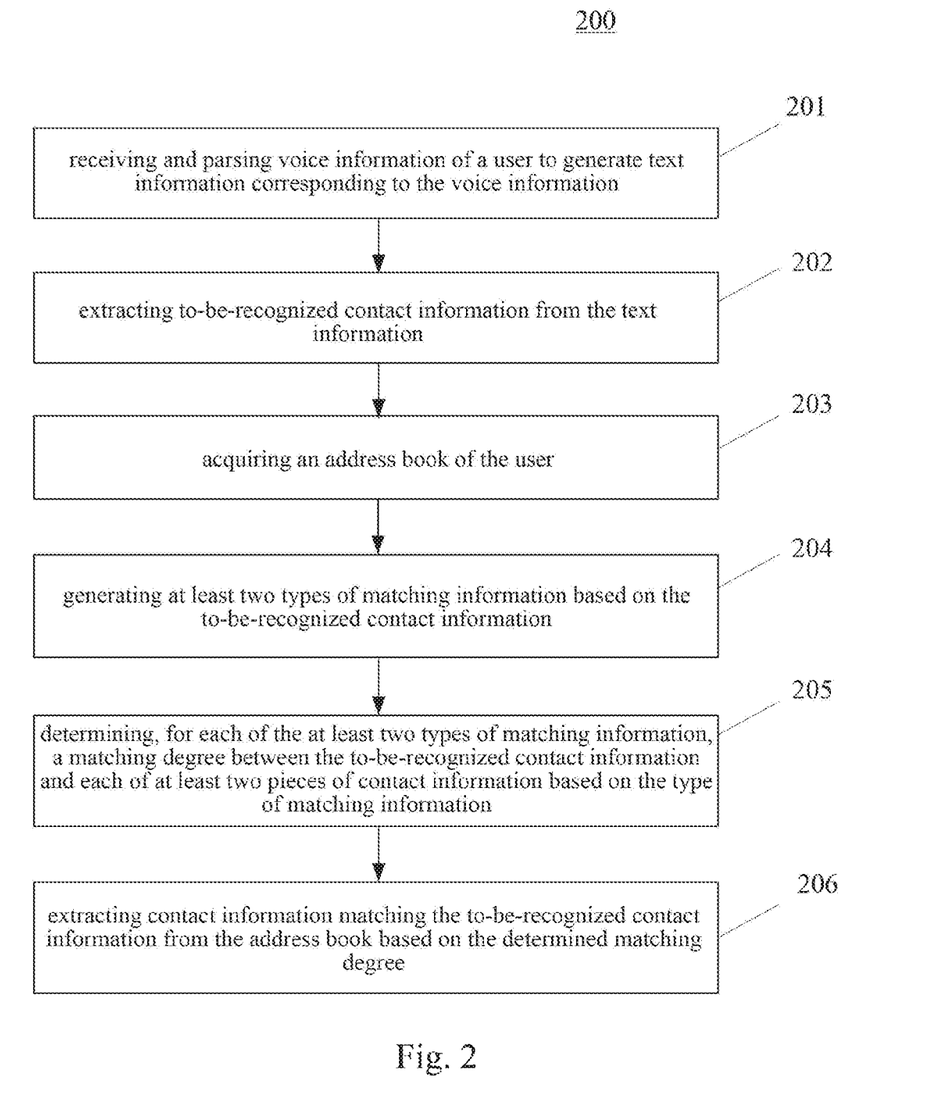
FIG. 2 is a flowchart of a method for extracting information according to an embodiment of the present disclosure.

With further reference to FIG. 2, a flow 200 of a method for extracting information according to an embodiment of the present disclosure is illustrated. The method for extracting information includes steps 201 to 206.

Step 201 includes receiving and parsing voice information of a user to generate text information corresponding to the voice information.

In this embodiment, the electronic device (e.g., the server as shown in FIG. 1) on which the method for extracting information is implemented may first receive voice information input by the user from a terminal device used by the user to perform the voice input, and then parse the voice information of the user to generate the text information corresponding to the voice information.

In this embodiment, the voice information of the user may be parsed to generate text information corresponding to the voice information using the speech recognition technique, and detailed description thereof will be omitted.

For example, the voice information of the user may be a voice corresponding to "calling Zhang San," and the generated text information is "calling Zhang San."

Step 202 includes extracting to-be-recognized contact information from the text information.

In this embodiment, the electronic device may extract to-be-recognized contact information from the text information.

For example, the to-be-recognized contact information may be extracted from the text information using a semantic analysis technique. For example, a topic model may be used to extract keywords in the text information, and then certain rules, such as extracting keywords of a certain part of speech, or extracting keywords in a certain position in the text information, may be used to extract the to-be-recognized contact information from the text information.

For example, a contact keyword set may also be preset, the to-be-recognized contact information is found from the text information by matching contact keywords in the contact keyword set and then the to-be-recognized contact information is extracted.

For example, the text information is "calling Zhang San," and the to-be-recognized contact information "Zhang San" may be extracted from this text information.

Step 203 includes acquiring an address book of the user.

In this embodiment, the electronic device may acquire the address book of the user.

In some alternative implementations of the present embodiment, the electronic device may receive the address book of the user from the terminal device.

In some alternative implementations of the present embodiment, the electronic device may alternatively acquire a pre-stored address book of the user locally.

Step 204 includes generating at least two types of matching information based on the to-be-recognized contact information.

In this embodiment, the electronic device may generate at least two types of matching information based on the to-be-recognized contact information.

In this embodiment, the matching information may be used to match the to-be-recognized contact information with the contact information in the address book, thereby extracting contact information that matches the to-be-recognized contact information.

For example, the matching information may be, but not limited to, the following information: pinyin corresponding to the to-be-recognized contact information, sound wave information corresponding to the to-be-recognized contact information, a name keyword, and a title keyword.

In this embodiment, the matching information generated in step 204 may include at least two types.

It should be noted that the voice input by the user may not convey the true meaning of the user accurately, due to some speaking habits or pronunciation habits of the user, such as a preference for abbreviations, a preference for colloquial expression, and a dialect ascent. By matching with a plurality of matching information, the contact information that is consistent with the true meaning of the user may be better recognized, thereby improving the accuracy of the extracted contact information.

Step 205 includes determining, for each of the at least two types of matching information, a matching degree between the to-be-recognized contact information and each of at least two pieces of contact information based on the type of matching information.

In this embodiment, the electronic device may determine, for each of the at least two types of matching information, the matching degree between the to-be-recognized contact information and each of the at least two pieces of contact information based on the type of matching information.

For example, in step 204, matching information A and matching information B are generated. The address book includes contact information C and contact information D. For the matching information A, based on the matching information A, it is determined that the matching degree between the to-be-recognized contact information and the contact information C is 90 percent, and the matching degree between the to-be-recognized contact information and the contact information D is 95 percent. For the matching information B, based on the matching information B, it is determined that the matching degree between the to-be-recognized contact information and the contact information C is 80 percent, and the matching degree between the to-be-recognized contact information and the contact information D is 70 percent.

Step 206 includes extracting contact information matching the to-be-recognized contact information from the address book based on the determined matching degree.

In this embodiment, the electronic device may extract the contact information matching the to-be-recognized contact information from the address book based on the determined matching degree.

In some alternative implementations of the present embodiment, the step 206 may be implemented in the following approach: selecting a predetermined number of matching degrees according to a descending order of matching degrees, and then extracting the contact information corresponding to the selected matching degrees from the address book.

In some alternative implementations of the present embodiment, the step 206 may further include: setting weights of the types of matching information in advance, and then determining the product between the matching degree determined in step 205 and the weight of the corresponding matching information as the final matching degree.

In some alternative implementations of the present embodiment, multiple pieces of contact information may be extracted. After the step 206, the method shown in this embodiment may further include: sending the extracted contact information to the terminal device used by the user, and then displaying, by the terminal device, the received contact information to the user for selection.

In some alternative implementations of the present embodiment, one piece of contact information may be extracted. In step 202, the intention information of the user may also be recognized from the text information. After the step 206, the method shown in this embodiment may further include: generating a control instruction corresponding to the intention information, for example, a dialing instruction, an instruction for generating a new message, and the like. The extracted contact information and the generated control instruction are transmitted to the terminal device used by the user. Then, the terminal device may execute the control instruction by using the received contact information.

Figure 3:
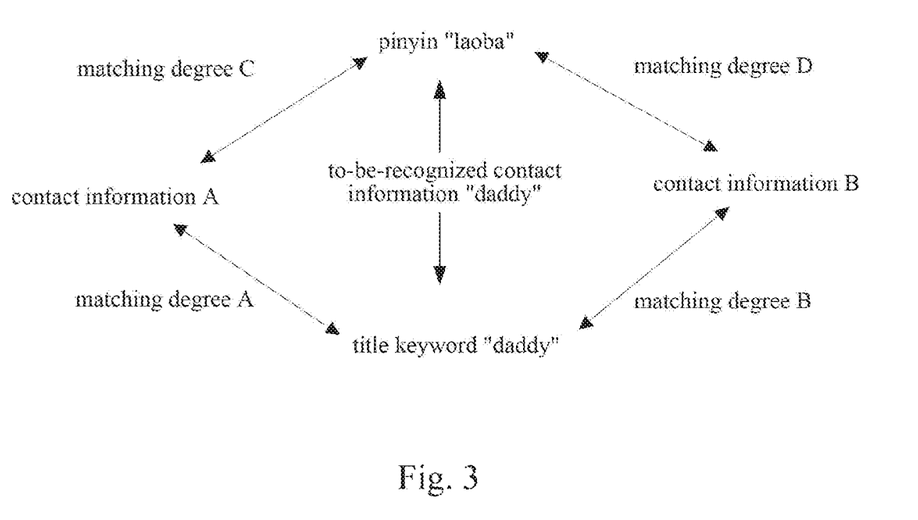
FIG. 3 is a schematic diagram of an application scenario of the method for extracting information according to the present disclosure.

With further reference to FIG. 3, a schematic diagram of an application scenario of the method for extracting information according to the present embodiment is illustrated. In the application scenario of FIG. 3, the user speaks a voice "calling daddy" to the terminal device. Then, the terminal device sends the voice information "calling daddy" to the server. After that, the server receives and parses the voice information, and generates text information "calling daddy" corresponding to the voice information. Then, the server may extract the to-be-recognized contact information "daddy" from the above text information. Moreover, the server may acquire the address book of the user, for example, the address book includes contact information A and contact information B. Then, the server may generate at least two types of matching information based on the to-be-recognized contact information, for example, the title keyword "daddy" and the pinyin "laoba" corresponding to the to-be-recognized contact information. Then, based on the title keyword "daddy," the matching degree A between the to-be-recognized contact information and the contact information A, and the matching degree B between the to-be-recognized contact information and the contact information B may be determined. Based on the pinyin "laoba", the matching degree C. between the to-be-recognized contact information and the contact information A, and the matching degree D between the to-be-recognized contact information and the contact information B may be determined. Based on the determined matching degree A, the matching degree B, the matching degree C., and the matching degree D, the contact information matching the to-be-recognized contact information is extracted from the address book. For example, for the matching degree A, the matching degree B, the matching degree C., and the matching degree D, the matching degree C. is the largest, and the contact information corresponding to the matching degree C., that is, the contact information A, may be extracted from the address book.

The method for extracting information provided by the above embodiments of the present disclosure first extracts to-be-recognized contact information from the voice of the user by using speech recognition, then generates at least two types of matching information based on the to-be-recognized contact information, and then determines the matching degree between the to-be-recognized contact information and each piece of contact information in the address book of the user based on each type of the matching information, and finally extracts the contact information using the matching degrees. During this process, the multiple types of matching information may be used for matching, so that the contact information matching the true meaning of the user may be better recognized, thereby improving the accuracy of the extracted contact information.

In some alternative implementations of the present embodiment, the matching information may be pinyin corresponding to the to-be-recognized contact information.

In some alternative implementations of the present embodiment, the step 204 may include: determining a first pinyin corresponding to the to-be-recognized contact information; and determining a second pinyin corresponding to the contact information, for each piece of contact information in the address book.

It may be understood that the number of second pinyin is equal to or greater than two. For convenience of explanation, the pinyin is distinguished using the first and the second, and the first pinyin is the pinyin corresponding to the to-be-recognized contact in essence.

For example, the to-be-recognized contact information is "Hu Guang," and the first pinyin corresponding to the to-be-recognized contact information is "huguang."

In some alternative implementations of the present embodiment, the step 205 may include: importing the first pinyin and the second pinyin corresponding to the contact information into a pre-established pinyin similarity model to generate a pinyin similarity between the first pinyin and the second pinyin, for each contact in the address book. The pinyin similarity model is used to represent a corresponding relation between the first pinyin, the second pinyin and the pinyin similarity. The pinyin similarity is determined as the matching degree between the to-be-recognized contact information and the contact information.

In this implementation, the pinyin similarity model may be established through the following process: labelling a large number of voice data (including spoken errors and dialect information) of the user with real ideograms, and using the labeled voice data as the training sample to train an initial model to obtain the pinyin similarity model. Here, the samples used in the training model may alternatively be divided according to regions for training to obtain the pinyin similarity model corresponding to each region.

In this implementation, the pinyin similarity model may be a comparison table. The comparison table lists the pinyin similarity between series of pinyin letters. The similarity between the first pinyin and the second pinyin may be found from the comparison table.

It should be noted that the use of the pinyin similarity model may adapt to the pronunciation habits of the user, such as a dialect accent and unclear pronunciation, to extract the contact information matching the true meaning of the user from the address book.

In some alternative implementations of the present embodiment, the step 205 may include: determining an edit distance between the to-be-recognized contact information and the contact information based on the first pinyin and the second pinyin corresponding to the contact information, for each piece of contact information in the address book; and determining the edit distance as the matching degree between the to-be-recognized contact information and the contact information.

In this implementation, the edit distance is the minimum number of edit operations required to convert one word string to the other word string. For example, to acquire the edit distance between one name and another, it is required to successively compare respective words contained in the two names. For example, to acquire the edit distance between "Li Lei" and "Wang Li," it is required to acquire the edit distance between "Li" and "Wang", and then acquire the edit distance between "Lei" and "Li," and then sum the two edit distances. The edit distance between two words is determined by comparing a pair of initial consonants, a pair of vowels and a pair of tones of the two words. If one of the pair of initial consonants, the pair of vowels and the pair of tones of the two words is different, the edit distance of the pronunciation of the two words is 1; if two of the pairs are different, the edit distance is 2; and if three of the pairs are different, the edit distance is 3.

In some alternative implementations of the present embodiment, the matching information may be sound wave information corresponding to the to-be-recognized contact information.

In some alternative implementations of the present embodiment, the step 204 may include: acquiring first sound wave information corresponding to the to-be-recognized contact information.

In this implementation, the first sound wave information may be acquired from pre-stored sound wave information.

In this implementation, the first sound wave information may alternatively be segmented from the voice information.

In some alternative implementations of the present embodiment, the step 204 may further include: acquiring second sound wave information corresponding to the contact information, for each piece of contact information in the address book.

In some alternative implementations of the present embodiment, the step 205 may include: determining a similarity between the first sound wave information and the second sound wave information corresponding to the contact information as the matching degree between the to-be-recognized contact information and the contact information, for each piece of contact information in the address book. How to calculate the similarity itself between pieces of sound wave information may be realized by those skilled in the art, and detailed description thereof will be omitted.

In some alternative implementations of the present embodiment, the matching information may be a name keyword.

In some alternative implementations of the present embodiment, the step 204 may include: extracting a name keyword from the to-be-recognized contact information.

For example, the name keyword "Feng Yi" may be extracted from the to-be-recognized contact information "Feng Yi Beauty."

In this implementation, a name keyword set may be preset, and a word in the same keyword set may be extracted from to-be-recognized contact information and used as the name keyword.

In some alternative implementations of the present embodiment, the step 205 may include: determining a duplication degree between the name keyword and the contact information as the matching degree between the to-be-recognized contact information and the contact information, for each piece of contact information in the address book.

For example, the contact information in the address book is "Zhang Fengyi" and "Zhang San," and then the duplication degree between "Fengyi" and "Zhang Fengyi", and the duplication degree between "Fengyi" and "Zhang San" may be calculated. As an example, the duplication degree may be the ratio of the number of words of the contact information identical to the name keyword, to the sum of the number of the words in the contact information and the number of the name keyword. Thus, the duplication degree between "Fengyi" and "Zhang Fengyi" is 40 percent, and the duplication degree between "Fengyi" and "Zhang San" is zero.

It should be noted that the use of the name keyword as the matching information may adapt to some speaking habits of the user, such as tending to use abbreviations, to extract the contact information matching the true meaning of the user from the address book.

In some alternative implementations of the present embodiment, the matching information is a title keyword.

In some alternative implementations of the present embodiment, the step 204 may include: extracting a title keyword from the to-be-recognized contact information.

In this implementation, a title set may be preset, and each word in the to-be-recognized contact information is matched with titles in the title set to extract the title keyword.

In some alternative implementations of the present embodiment, the step 205 may include: acquiring pre-generated title relationship information. Here, the title relationship information is used to indicate an association relationship between titles expressing the same meaning.

For example, the title "dad" and the title "daddy" express the same meaning.

In some alternative implementations of the present embodiment, the step 205 may further include: acquiring a target title having the same meaning as the title keyword based on the title relationship information.

For example, the title keyword is "dad," and the acquired target title may include "daddy," "dad," "father" and the like.

In some alternative implementations of the present embodiment, the step 205 may further include: selecting, from the matching degree between the title keyword and the contact information and the matching degree between the target title and the contact information, a maximum matching degree, as the matching degree between the to-be-recognized contact information and the contact information, for each piece of contact information in the address book.

For example, the address book includes "beautiful mom" and "adorable daddy." The respective matching degrees between "papa," "dad," "daddy", "father" and "beautiful mom" may be calculated, and the respective matching degrees between "papa," "dad," "daddy", "father" and "adorable daddy" may be calculated. Obviously, in this series of matching, "daddy" has the highest matching degree with "adorable daddy."

In some alternative implementations of the present embodiment, the highest priority may be set for the title keyword. Once the contact information having a matching degree greater than a preset matching degree threshold is found based on the title keyword, contact information found based on other matching information is not adopted, and the contact information found based on the title keyword is directly extracted.

It should be noted that the use of the title keyword as the matching information may adapt to some expression habits of the user, such as tending to use colloquial expressions, to recognize the contact information matching the true meaning of the user.

It should be noted that the series of the matching information may improve the accuracy of the extracted information, and reduce requirements on the accuracy of the expression of the user. For example, the user only needs to express a part of the name of the stored contact to match the desired contact.

Figure 4:
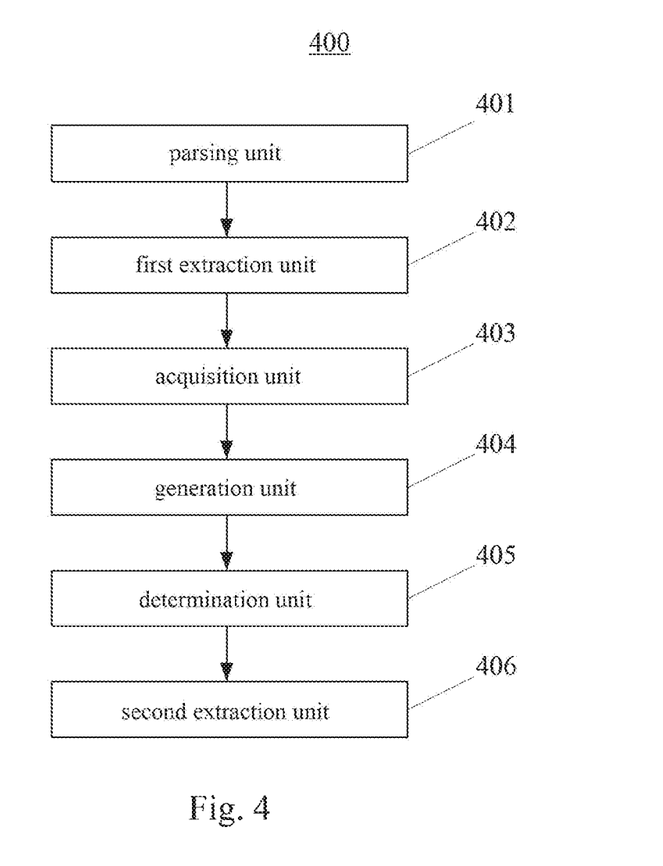
FIG. 4 is a schematic structural diagram of an apparatus for extracting information according to an embodiment of the present disclosure.

With further reference to FIG. 4, as an implementation to the method shown in the above figures, an apparatus for extracting information is provided according to an embodiment of the present disclosure. The apparatus embodiment corresponds to the method embodiment shown in FIG. 2, and the apparatus may specifically be applied to various electronic devices.

As shown in FIG. 4, the apparatus 400 for extracting information according to the present embodiment includes: a parsing unit 401, a first extraction unit 402, an acquisition unit 403, a generation unit 404, a determination unit 405 and a second extraction unit 406. The parsing unit is configured to receive and parse voice information of a user to generate text information corresponding to the voice information. The first extraction unit is configured to extract to-be-recognized contact information from the text information. The acquisition unit is configured to acquire an address book of the user, the address book including at least two pieces of contact information. The generation unit is configured to generate at least two types of matching information based on the to-be-recognized contact information. The determination unit is configured to determine, for each of the at least two types of matching information, a matching degree between the to-be-recognized contact information and each of the at least two pieces of contact information based on the type of matching information. The second extraction unit is configured to extract contact information matching the to-be-recognized contact information from the address book based on the determined matching degree.

In some alternative implementations of the present embodiment, the matching information is pinyin corresponding to the to-be-recognized contact information. The generation unit is further configured to determine a first pinyin corresponding to the to-be-recognized contact information; and determine a second pinyin corresponding to the contact information, for each piece of contact information in the address book.

In some alternative implementations of the present embodiment, the determination unit is further configured to: import the first pinyin and the second pinyin corresponding to the contact information into a pre-established pinyin similarity model to generate a pinyin similarity between the first pinyin and the second pinyin, for each piece of contact information in the address book, wherein the pinyin similarity model is used to represent a corresponding relation between the first pinyin, the second pinyin and the pinyin similarity; and determining the pinyin similarity as the matching degree between the to-be-recognized contact information and the contact information.

In some alternative implementations of the present embodiment, the determination unit is further configured to: determine an edit distance between the to-be-recognized contact information and the contact information based on the first pinyin and the second pinyin corresponding to the contact information, for each piece of contact information in the address book; and determine the edit distance as the matching degree between the to-be-recognized contact information and the contact information.

In some alternative implementations of the present embodiment, the matching information is sound wave information corresponding to the to-be-recognized contact information. The generation unit is further configured to: acquire first sound wave information corresponding to the to-be-recognized contact information; and acquire second sound wave information corresponding to the contact information, for each piece of contact information in the address book.

In some alternative implementations of the present embodiment, the determination unit is further configured to: determine a similarity between the first sound wave information and the second sound wave information corresponding to the contact information as the matching degree between the to-be-recognized contact information and the contact information, for each piece of contact information in the address book.

In some alternative implementations of the present embodiment, the matching information is a name keyword. The generation unit is further configured to: extract a name keyword from the to-be-recognized contact information. The determination unit is further configured to: determine a duplication degree between the name keyword and the contact information as the matching degree between the to-be-recognized contact information and the contact information, for each piece of contact information in the address book.

In some alternative implementations of the present embodiment, the matching information is a title keyword. The generation unit is further configured to: extract a title keyword from the to-be-recognized contact information.

In some alternative implementations of the present embodiment, the determination unit is further configured to: acquire pre-generated title relationship information, wherein the title relationship information is used to indicate an association relationship between titles expressing the same meaning; acquire a target title having the same meaning as the title keyword based on the title relationship information; and select, from a matching degree between the title keyword and the contact information and a matching degree between the target title and the contact information, a maximum matching degree as the matching degree between the to-be-recognized contact information and the contact information, for each piece of contact information in the address book.

In this embodiment, the specific processing and the technical effects thereof of the parsing unit 401, the first extraction unit 402, the acquisition unit 403, the generation unit 404, the determination unit 405, and the second extraction unit 406 may be respectively referred to the related descriptions of step 201, step 202, step 203, step 204, step 205 and step 206 in the corresponding embodiment in FIG. 2, and detailed description thereof will be omitted.

It should be noted that the implementation details and technical effects of the units in the apparatus for extracting information provided in this embodiment may be referred to the description of other embodiments in the present disclosure, and detailed description thereof will be omitted.

Figure 5:
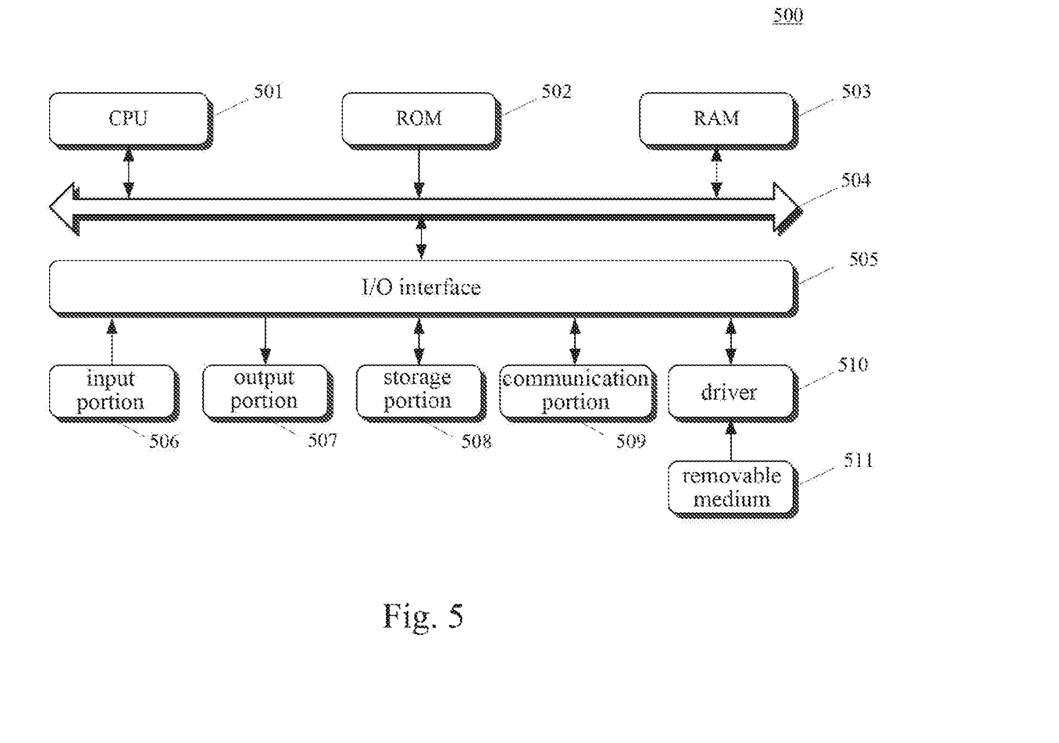
FIG. 5 is a schematic structural diagram of a computer system adapted to implement a device of embodiments of the present disclosure.

Referring to FIG. 5, a schematic structural diagram of a computer system 500 adapted to implement a terminal device the embodiments of the present disclosure is shown. FIG. 5 is only an example, and should not limit the function and the scope of the embodiments of the disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 including a cathode ray tube (CRT), a liquid crystal display device (LCD), a speaker etc.; a storage portion 508 including a hard disk and the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511 and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a parsing unit, a first extraction unit, an acquisition unit, a generation unit, a determination unit and a second extracting unit, where the names of these units do not in some cases constitute a limitation to such units themselves. For example, the parsing unit may also be described as "a unit for parsing the voice information of the user, and generating text information corresponding to the voice information."

In another aspect, the present disclosure further provides a computer-readable medium. The computer-readable medium may be the computer medium included in the apparatus in the above described embodiments, or a stand-alone computer-readable medium not assembled into the apparatus. The computer-readable medium stores one or more programs. The one or more programs, when executed by a device, cause the device to: receive and parse voice information of a user to generate text information corresponding to the voice information; extract to-be-recognized contact information from the text information; acquire an address book of the user, the address book including at least two pieces of contact information; generate at least two types of matching information based on the to-be-recognized contact information; determine, for each of the at least two types of matching information, a matching degree between the to-be-recognized contact information and each of at least two pieces of contact information based on the type of matching information; and extract contact information matching the to-be-recognized contact information from the address book based on the determined matching degree.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for extracting information, comprising:
  receiving and parsing voice information of a user to generate text information corresponding to the voice information;
  extracting to-be-recognized contact information from the text information;
  acquiring an address book of the user, the address book comprising at least two pieces of contact information;
  generating at least two types of matching information based on the to-be-recognized contact information;
  determining, for each of the at least two types of matching information, a matching degree between the to-be-recognized contact information and each of the at least two pieces of contact information based on the type of matching information wherein the matching information is a name keyword, and the matching degree is the ratio of a number of words of the contact information identical to the name keyword, to a sum of the number of the words in the contact information and a number words in the name keyword; and
  extracting contact information matching the to-be-recognized contact information from the address book based on the determined matching degree,
  wherein the method is performed by at least one processor.

2. The method according to claim 1, wherein the matching information is pinyin corresponding to the to-be-recognized contact information; and
  the generating at least two types of matching information based on the to-be-recognized contact information comprises:
    determining a first pinyin corresponding to the to-be-recognized contact information; and
    determining a second pinyin corresponding to each piece of contact information in the address book.

3. The method according to claim 2, wherein the determining, for each of the at least two types of matching information, a matching degree between the to-be-recognized contact information and each of the at least two pieces of contact information based on the type of matching information, comprises:
  importing, for each piece of contact information in the address book, the first pinyin and the second pinyin corresponding to the each piece of contact information into a pre-established pinyin similarity model to generate a pinyin similarity between the first pinyin and the second pinyin, wherein the pinyin similarity model is used to represent a corresponding relation between the first pinyin, the second pinyin and the pinyin similarity; and
  determining the pinyin similarity as the matching degree between the to-be-recognized contact information and the contact information.

4. The method according to claim 2, wherein the determining, for each of the at least two types of matching information, a matching degree between the to-be-recognized contact information and each of the at least two pieces of contact information based on the type of matching information, comprises:
  determining, for each piece of contact information in the address book, an edit distance between the to-be-recognized contact information and the each piece of contact information based on the first pinyin and the second pinyin corresponding to the contact information; and
  determining the edit distance as the matching degree between the to-be-recognized contact information and the each piece of contact information.

5. The method according to claim 1, wherein the matching information is sound wave information corresponding to the to-be-recognized contact information; and
  the generating at least two types of matching information based on the to-be-recognized contact information, comprises:
    acquiring first sound wave information corresponding to the to-be-recognized contact information; and
    acquiring, for each piece of contact information in the address book, second sound wave information corresponding to the each piece of contact information.

6. The method according to claim 5, wherein the determining, for each of the at least two types of matching information, a matching degree between the to-be-recognized contact information and each of the at least two pieces of contact information based on the type of matching information, comprises:
  determining, for each piece of contact information in the address book, a similarity between the first sound wave information and the second sound wave information corresponding to the each piece of contact information as the matching degree between the to-be-recognized contact information and the each piece of contact information.

7. The method according to claim 1, wherein the matching information is a title keyword; and
  the generating at least two types of matching information based on the to-be-recognized contact information, comprises:
    extracting a title keyword from the to-be-recognized contact information.

8. The method according to claim 7, wherein the determining, for each of the at least two types of matching information, a matching degree between the to-be-recognized contact information and each of the at least two pieces of contact information based on the type of matching information, comprises:
  acquiring pre-generated title relationship information, wherein the title relationship information is used to indicate an association relationship between titles expressing the same meaning;
  acquiring a target title including the same meaning as the title keyword based on the title relationship information; and
  selecting, for each piece of contact information in the address book, a maximum matching degree as the matching degree between the to-be-recognized contact information and the each piece of contact information, from a matching degree between the title keyword and the each piece of contact information and a matching degree between the target title and the each piece of contact information.

9. An apparatus for extracting information, the apparatus comprising:
  at least one processor; and
  a memory storing instructions, wherein the instructions, when executed by the at least one processor, cause the at least one processor to perform operations, the operations comprising:
  receiving and parsing voice information of a user to generate text information corresponding to the voice information;
  extracting to-be-recognized contact information from the text information;
  acquiring an address book of the user, the address book comprising at least two pieces of contact information;
  generating at least two types of matching information based on the to-be-recognized contact information;
  determining, for each of the at least two types of matching information, a matching degree between the to-be-recognized contact information and each of the at least two pieces of contact information based on the type of matching information wherein the matching information is a name keyword, and the matching degree is the ratio of a number of words of the contact information identical to the name keyword, to a sum of the number of the words in the contact information and a number words in the name keyword; and
  extracting contact information matching the to-be-recognized contact information from the address book based on the determined matching degree.

10. The apparatus according to claim 9, wherein the matching information is pinyin corresponding to the to-be-recognized contact information; and
  the generating at least two types of matching information based on the to-be-recognized contact information, comprises:
  determining a first pinyin corresponding to the to-be-recognized contact information; and
  determining a second pinyin corresponding to each piece of contact information in the address book.

11. The apparatus according to claim 10, wherein the determining, for each of the at least two types of matching information, a matching degree between the to-be-recognized contact information and each of the at least two pieces of contact information based on the type of matching information, comprises:
  importing, for each piece of contact information in the address book, the first pinyin and the second pinyin corresponding to the each piece of contact information into a pre-established pinyin similarity model to generate a pinyin similarity between the first pinyin and the second pinyin, wherein the pinyin similarity model is used to represent a corresponding relation between the first pinyin, the second pinyin and the pinyin similarity; and
  determining the pinyin similarity as the matching degree between the to-be-recognized contact information and the contact information.

12. The apparatus according to claim 10, wherein the determining, for each of the at least two types of matching information, a matching degree between the to-be-recognized contact information and each of the at least two pieces of contact information based on the type of matching information, comprises:
  determining, for each piece of contact information in the address book, an edit distance between the to-be-recognized contact information and the each piece of contact information based on the first pinyin and the second pinyin corresponding to the contact information; and
  determining the edit distance as the matching degree between the to-be-recognized contact information and the each piece of contact information.

13. The apparatus according to claim 9, wherein the matching information is sound wave information corresponding to the to-be-recognized contact information; and
  the generating at least two types of matching information based on the to-be-recognized contact information, comprises:
  acquiring first sound wave information corresponding to the to-be-recognized contact information; and
  acquiring, for each piece of contact information in the address book, second sound wave information corresponding to the each piece of contact information.

14. The apparatus according to claim 13, wherein the determining, for each of the at least two types of matching information, a matching degree between the to-be-recognized contact information and each of the at least two pieces of contact information based on the type of matching information, comprises:
  determining, for each piece of contact information in the address book, a similarity between the first sound wave information and the second sound wave information corresponding to the each piece of contact information as the matching degree between the to-be-recognized contact information and the each piece of contact information.

15. The apparatus according to claim 9, wherein the matching information is a title keyword; and
  the generating at least two types of matching information based on the to-be-recognized contact information, comprises:
  extracting a title keyword from the to-be-recognized contact information.

16. The apparatus according to claim 15, wherein the determining, for each of the at least two types of matching information, a matching degree between the to-be-recognized contact information and each of the at least two pieces of contact information based on the type of matching information, comprises:
  acquiring pre-generated title relationship information, wherein the title relationship information is used to indicate an association relationship between titles expressing the same meaning;
  acquiring a target title including the same meaning as the title keyword based on the title relationship information; and selecting, for each piece of contact information in the address book, a maximum matching degree as the matching degree between the to-be-recognized contact information and the each piece of contact information, from a matching degree between the title keyword and the each piece of contact information and a matching degree between the target title and the each piece of contact information.

17. A non-transitory computer medium, comprising a computer program, wherein the program, when executed by a processor, causes the processor to perform operations, the operations comprising:

receiving and parsing voice information of a user to generate text information corresponding to the voice information;

extracting to-be-recognized contact information from the text information;

acquiring an address book of the user, the address book comprising at least two pieces of contact information;

generating at least two types of matching information based on the to-be-recognized contact information;

determining, for each of the at least two types of matching information, a matching degree between the to-be-recognized contact information and each of the at least two pieces of contact information based on the type of matching information, wherein the matching information is a name keyword, and the matching degree is the ratio of a number of words of the contact information identical to the name keyword, to a sum of the number of the words in the contact information and a number words in the name keyword; and extracting contact information matching the to-be-recognized contact information from the address book based on the determined matching degree.

* * * * *

UNITED STATES PATENT AND TRADEMARK OFFICE
CERTIFICATE OF CORRECTION

PATENT NO. : 11,217,236 B2
APPLICATION NO. : 16/105560
DATED : January 4, 2022
INVENTOR(S) : Xiangyu Pang Page 1 of 1

It is certified that error appears in the above-identified patent and that said Letters Patent is hereby corrected as shown below:

On the Title Page

Column 1 (Applicant), Line 2, delete "(CN)" and insert --(CN); Shanghai Xiaodu Technology Co. Ltd., Shanghai (CN)--.

Column 1 (Assignees), Line 3, delete "Xiadu" and insert --Xiaodu--.

In the Claims

Column 13, Line 47, Claim 1, delete "information" and insert --information,--.

Column 15, Line 39, Claim 9, delete "information" and insert --information,--.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*